Aug. 29, 1950  W. J. HUGHES  2,520,545
FEEDER WITH ROCKABLE OSCILLATABLE DISCHARGE ELEMENT
AND OSCILLATABLE HOPPER AGITATING PLATES
Filed June 15, 1945  4 Sheets-Sheet 2

Fig. 2.

INVENTOR.
Walter J. Hughes,
BY
Robyn Wilcox
Atty.

Aug. 29, 1950         W. J. HUGHES         2,520,545
FEEDER WITH ROCKABLE OSCILLATABLE DISCHARGE ELEMENT
AND OSCILLATABLE HOPPER AGITATING PLATES
Filed June 15, 1945                    4 Sheets-Sheet 3

INVENTOR.
Walter J. Hughes,
BY
Robyn Wilcox
ATTY

Patented Aug. 29, 1950

2,520,545

UNITED STATES PATENT OFFICE 2,520,545

FEEDER WITH ROCKABLE OSCILLATABLE DISCHARGE ELEMENT AND OSCILLATABLE HOPPER AGITATING PLATES

Walter J. Hughes, Chicago, Ill., assignor to Infilco Incorporated, Chicago, Ill., a corporation of Delaware Application June 15, 1945, Serial No. 599,734

9 Claims. (Cl. 222—199)

This invention relates to a device for feeding dry pulverant materials.

An object of this invention is to provide an improved apparatus for feeding pulverant material at predetermined rates.

Another object of this invention is to provide a feeder capable of feeding predetermined quantities of pulverant material with great accuracy irrespective of the rate of feed.

Another object is to provide a dry feeder which can easily and quickly be set to feed at any desired rate over a wide range.

An important object of the invention is to provide a feeder having a substantially linear feed rate adjustment, i. e. a rate of feed varying directly with the amplitude of the extrusion motion at all settings, including zero.

Another object is to provide in a dry feeder means for upheaving of material in the feeder hopper by a motion which is independent of the amplitude of the extruding motion and uniform at all feed rates.

Other objects of the invention will become apparent from the detailed description of the invention which follows.

Dry feeders for pulverant materials generally comprise a bin, or hopper, which holds the material to be fed and which usually discharges by gravity onto a receiving or supporting surface, or tray, which may be a stationary table or plate, or movable, such as a rotating disk or a belt conveyor, and means for discharging measured quantities of material from the tray or surface.

One of the difficulties generally experienced with such feeders, and especially when feeding certain materials, such as hydrated lime, is due to the tendency of such materials to compact in the bin. It is therefore usual to provide some means to prevent compacting and what is commonly known as "arching," i. e. the formation of an arch of compacted material over the outlet of the bin which prevents uniform gravity flow of material from the bin. Various means have been proposed for this purpose. Thus agitators have been used which were installed either to rotate or reciprocate through the material inside the bin or within the delivery mouth of the bin to break up and loosen material compacting at this point. These agitators were often combined with some means operating over the receiving tray for pushing measured quantities of material from the receiving tray or surface. Another proposal has been to intermittently flex the walls of the material holding hopper. This latter idea has, however, the disadvantage that a flexible hopper must be constructed of relatively light material, which is not always sufficiently strong to support the weight of the material to be fed.

It has also been suggested that an oscillating scoop be interposed between the material holding bin and its subjacent discharge surface to upheave the material in the bin. Such reciprocation of the scoop has also been utilized for pushing measured quantities of material from the receiving surface. However, I have found that there are certain disadvantages in combining the discharge of material from the stationary surface and the upheaving of material in the bin by such a reciprocal device. One disadvantage is that when the rate of feed is small the upheaving motion practically ceases, so that the operation of such feeders tends to become increasingly inaccurate as the rate of feed decreases.

I propose to correct this inaccuracy by applying two separate and independent movements to the material. One of such movements is effective to upheave the material to be fed, and thus secure its free flow, which movement is continual and relatively unaffected by the rate of feed. The other movement is effective to push the material from the receiving tray, which latter movement is adjustable to the desired rate of feed. I am thereby enabled to combine substantial upheaving of material in the bin with extremely accurate feeding, even at the lowest practical rates.

I have also found that I can secure better results and a considerable saving in power by reciprocating and rocking the material receiving tray, or pan, rather than an intermediate material handling scoop. I use a stationary bin, or hopper, from which material flows by gravity to a subjacent tray, or pan, so mounted as to reciprocate laterally and simultaneously to rock, or teeter, on a central transverse axis; and I apply to this pan a variable reciprocable movement and, independently of such reciprocation, a rocking or tipping movement. I also provide on the stationary bin simple means which cooperate with the reciprocating tray in the extrusion of material fed thereto, and means for exactly regulating the depth of the ribbon of material pushed from the tray.

When feeding certain materials, such as hydrated lime, a moderate upheaving motion imparted to the material in the hopper is not always sufficient to insure uniform flow of material from the hopper to the receiving surface, with consequent inaccuracy of feed. It has therefore been a general experience with feeders utilizing upheaving for bin agitation that the feed of such materials as lime was several per cent less exact than that of less troublesome materials on the same machines. To prevent such inexactness in feeding hydrated lime and the like, I supplement the upheaving of the material, which acts mainly on those portions of the material near the discharge end of the hopper, by agitating the material in the upper portions of the hopper, and I do this in a novel and very effective manner. In the old art it was usual, for this purpose to rotate or reciprocate an agitator through the material, or to vibrate or flex the hopper walls. The former type required considerable power and the latter type provided only local agitation. In contrast, I shift superposed layers of material laterally and oppositely across the hopper and obtain thereby agitation over a much greater area, and with less power. Briefly the agitating device comprises opposed pairs of oscillating agitator plates mounted at suitable elevations so as to be tiltable through openings in the hopper side walls into and out of the hopper in unison, but in opposite directions, suitable means outside the hopper for moving the plates, and a flexible seal, preventing escape of material from the hopper through the openings.

The various aspects of my invention will be more fully understood by reference to the description and the drawings which form a part of this specification and which show a preferred embodiment of my apparatus. It will be understood that the embodiment shown is for purposes of exemplification only and is not the sole form in which my invention may be applied.

The main parts of the feeder comprise a stationary bin, or hopper 20 adapted to hold a supply of material to be fed, a movable pan, or tray 30 mounted below the bin 20 and receiving material therefrom, and a drive means arranged to reciprocate the tray laterally and simultaneously, and independent of the lateral reciprocation to rock, or teeter, the tray over a central cross shaft. I provide a suitable mechanism for agitating the material in the hopper 20, and preferably this takes the new and novel form disclosed herein.

Figure 1:
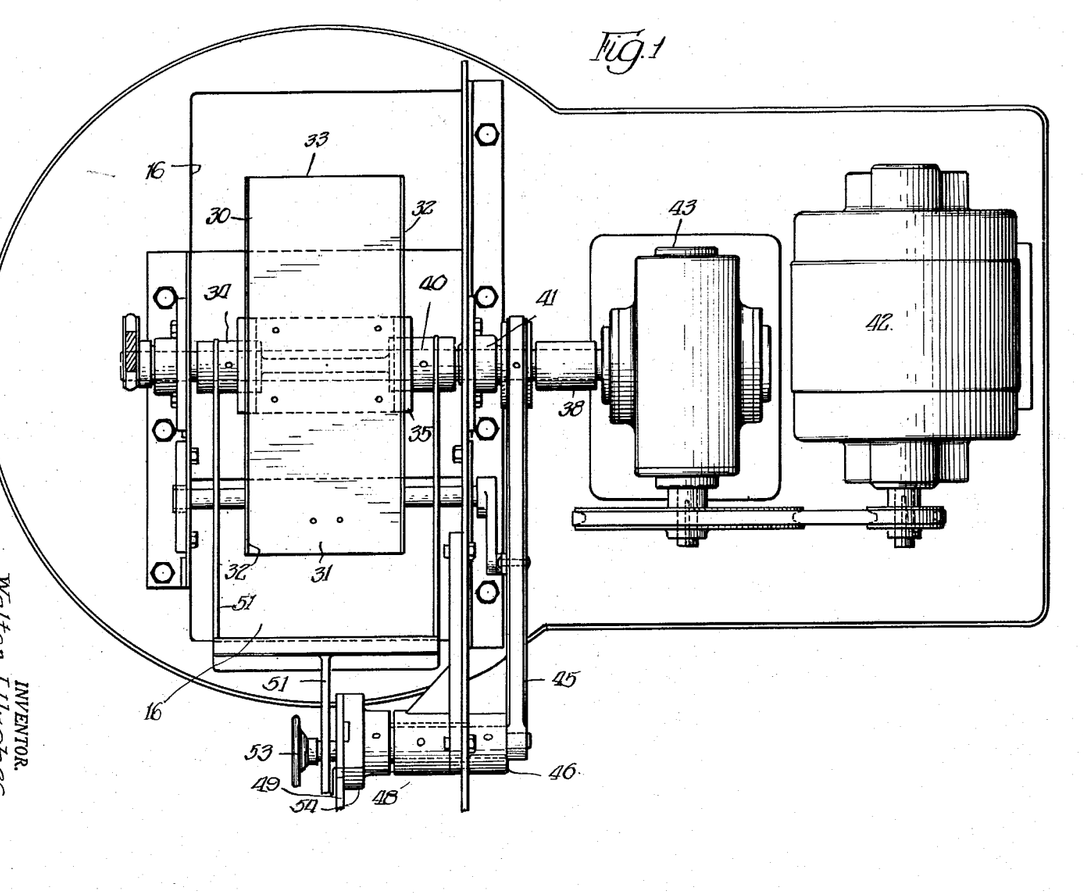
Figure 1 is a plan view of a feeder embodying a preferred form of my invention, with the hopper and agitating assembly removed.
Figure 2:
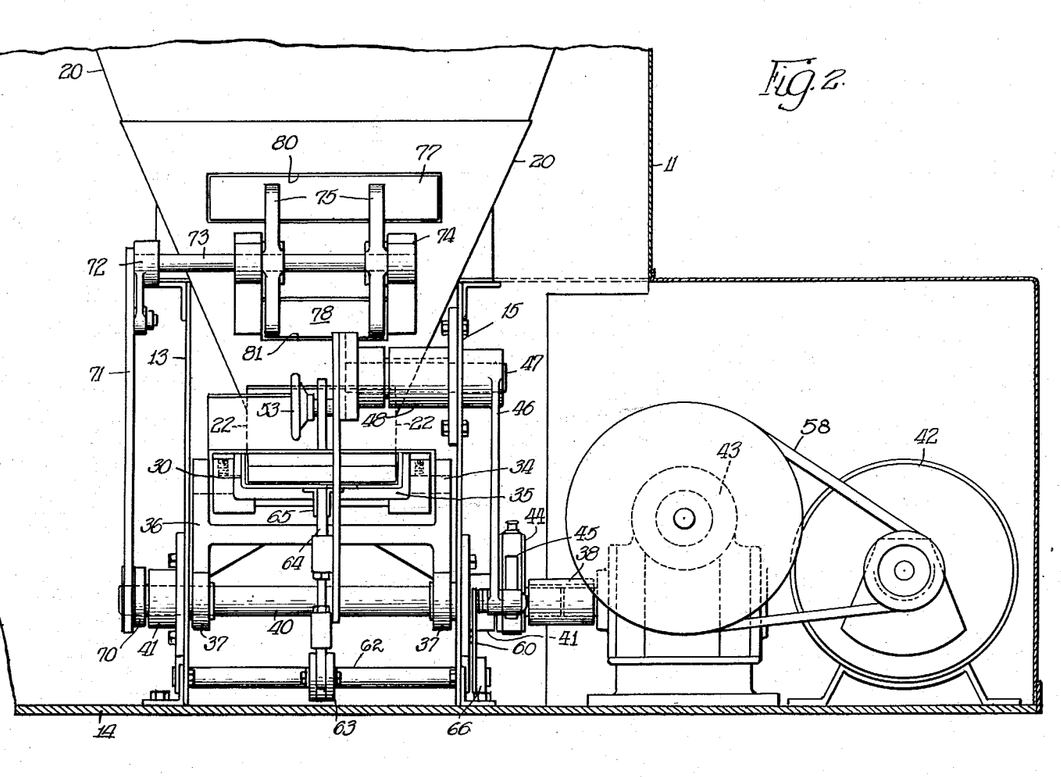
Figure 2 is a side view of my feeder, partly in section, with the hopper and agitating assembly added.

The feeder generally will be enclosed in any suitable housing 11, as indicated in Figure 2. The hopper 20, tray 30 and related operating mechanism are mounted on a frame work 13, which comprises a base plate 14 and upstanding parallel walls 15. As shown in Figure 1, the base plate 14 has an opening 16 located below the tray 30, through which material pushed from the tray 30 may drop into any underlying device, such as a mixer, agitator, or the like, not shown.

Figure 4:
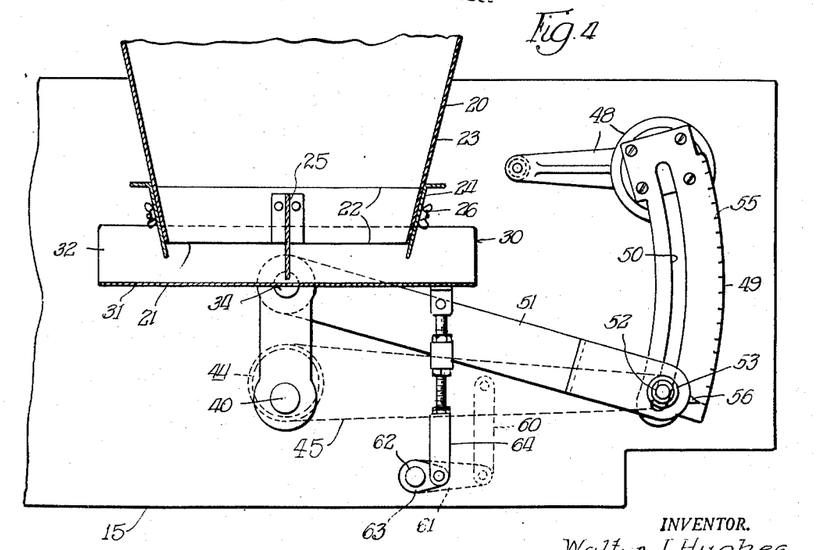
Figure 4 is a sectional view of the feeder shown in Figures 1 to 3.

The hopper 20 has sloping side and end walls 22 and 23, respectively, and an open bottom 21, as shown in Figures 2 and 4. The lower ends of the side walls 22 are bent from hopper slope to the vertical. The end walls 23 of the hopper 20 are fitted with slidable gates 24 adapted to be held at any desired position by any suitable means, such as wing nuts 26, as shown in Figure 4. A dividing plate 25 is attached to the side walls 22 of the hopper 20, preferably midway between the end walls 23, and extends downwardly well below the lower end 21 of the hopper 20.

Figure 3:
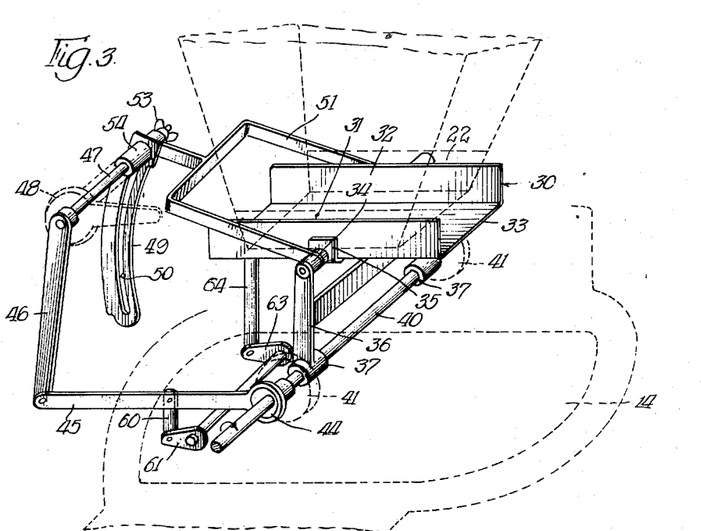
Figure 3 is a perspective view of a preferred form of the receiving tray and its associated tray reciprocating and rocking assembly.

Mounted below the hopper 20, in manner to be described below, is the feeding tray, or pan 30. The tray 30 is shown in Figure 3 as having a rectangular flat bottom 31 and vertical sides 32, while the ends 33 of the tray 30 are open. As shown in Figure 2, the tray 30 is of sufficient width to enclose the lower portion of the hopper 20 between the tray side walls 22 and the tray side walls 32. Preferably the clearance between the vertical hopper walls 22 and the tray side walls 32 will be small, such as $\frac{1}{32}$ of an inch. Due to the fact that the lower portions of the hopper side walls 22 are bent to the vertical, they are parallel to the upbent sides 32 of the tray and clearance is maintained therebetween throughout all positions of the tray during its feeding motions. In this manner jamming of material between the two parts is avoided.

The tray, or pan, 30 is rigidly mounted in a saddle 35 which is rotatably supported on trunnions 34 carried by supporting links 36. The supporting links 36 are pivotally supported from the drive shaft 40 which extends through both frame walls 15. Bearings 37, in which the supporting links 36 are carried on the drive shaft, permit rotation of the shaft 40 without imparting motion to the supporting links 36 which ride freely on the shaft. The bin 20 and the tray 30 will preferably be mounted relative to each other so that the lower end 21 of the bin 20 terminates about one inch above the bottom of the tray. This provides for a small clearance between the lower edge of the plate 25 and the tray bottom 31.

Figure 5:
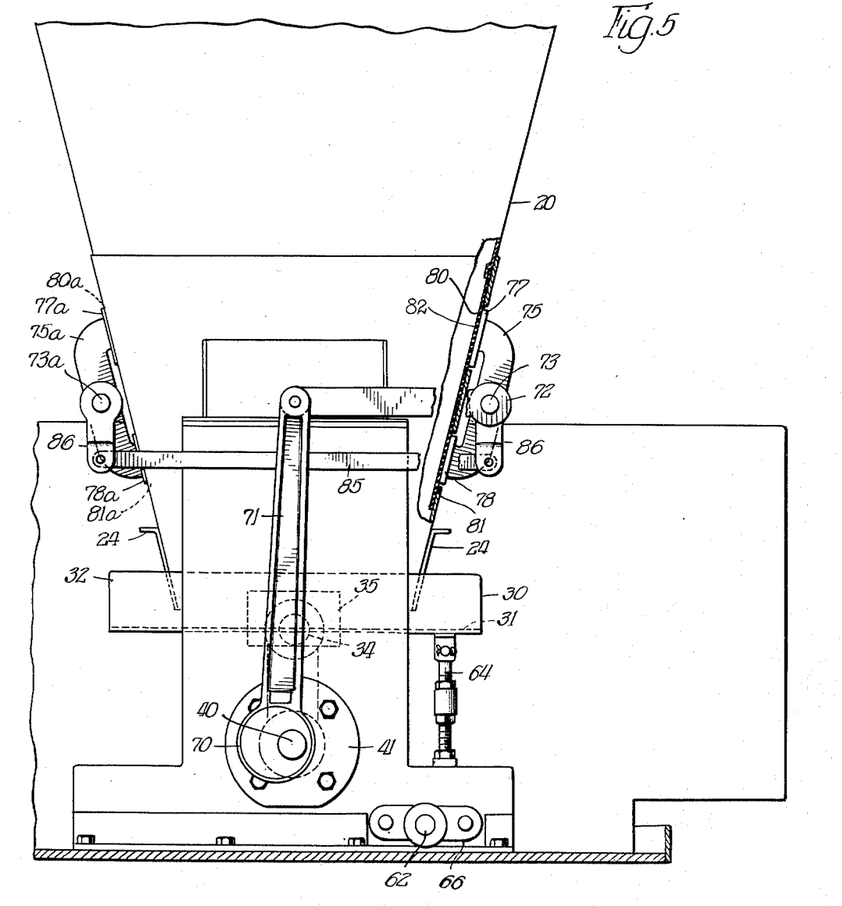
Figure 5 is an end view, partially in section, showing a preferred form of agitating mechanism.

The drive shaft 40 is supported, as in bearings 41 in the walls 15 of the frame 13. It may be connected by a coupling, such as 38, to the reducer 43, which in turn is driven by the motor 42 through any suitable connection such as the belt 58. As best shown in Figures 3 and 4, the drive assembly comprises independent mechanisms for laterally reciprocating the tray 30, and also for rocking it. Both mechanisms are driven from the drive shaft 40. As shown in Figures 2 and 5, the mechanism for agitating material in the bin 20 is likewise driven from the drive shaft 40.

The mechanism for laterally reciprocating the tray, or pan, 30 is shown in detail in Figures 3 and 4. It comprises an eccentric 44 mounted toward one end of the drive shaft 40 and connected by a link 45 to a crank 46. The other end of the crank 46 is rigidly affixed to a crank shaft 47 which may be supported in suitable bearings 48 in the walls 15 of the frame 13. Also rigidly mounted on the crank shaft 47, as by a hub 54, is a bar 49. The bar 49 is provided with a slot 50 which is curved to form the segment of a circle with a radius equal to the distance from the axis of the trunnions 34 to the axis of the crank shaft 47. A forked link 51 serves as a connecting rod between the trunnions 34 and an adjusting pin 52 which is movable along the slot 50 of the bar 49 and may be set at any desired position in the slot by any suitable means such as a wing nut, or a knob 53.

A dial 55 may be mounted on the bar 49, if desired, and be properly calibrated to show feed rates at various positions of the pin 52. In such case a pointer 56 can be mounted on the end of the forked link 51 to register with the markings on the dial 55.

Figures 2, 3 and 4 also show the mechanism for independently rocking, or tipping, the tray 30. A connecting rod 60 is pinned to an intermediate portion of the main connecting rod or link 45 and also to the free end of a crank 61 keyed to a crank shaft 62 which may be journaled in suitable bearings 66. Also keyed to the crank shaft 62 is a tipper crank 63. A tipper link 64 is pinned to the tipper crank 63 and also is connected to the tray 30 by suitable means, such as a clevis 65, which is mounted on the underside of the tray 30 outwardly toward one end of the tray.

The agitating mechanism is shown in Figures 2 and 5. A pair of shafts, 73 and 73a, one at each end of the hopper, are journaled in suitable bearings, such as those shown at 74, mounted on the end walls of the hopper. Mounted on each shaft, 73 and 73a respectively, is a pair of arms, 75 and 75a, respectively. The two arms 75 carry upper and lower agitating or shifting plates 77 and 78 and the two arms 75a, on the other end wall of the hopper, carry similar upper and lower agitating or shifting plates 77a and 78a. Upper and lower openings 80, 81 and 80a, 81a, are provided in opposite end walls of the hopper 20. The openings 80, 81, 80a and 81a are of a shape corresponding to that of the plates 77, 78, 77a and 78a and are slightly larger than the respective plates. As shown in Figure 5, each pair of openings, 80, 81 and 80a, 81a respectively, is covered on the inside of the hopper 20 by a flexible sealing device such as a diaphragm or curtain 82 of suitable material, such as for instance rubber, which may be held by any suitable means on the hopper walls. As shown, the curtains 82 are fixed with their upper edge to the upper edge of the respective side wall so as to hang freely down inside the hopper, and extend downwardly below the lower openings 81 or 81a. Preferably, and as shown in Figure 2, the lower openings 81 and 81a, and the plates 78 and 78a, cooperating therewith, will be somewhat smaller than the upper openings 80 and 80a, and the upper plates 77 and 77a.

The shafts 73 and 73a are driven from the drive shaft 40. While this could be done by connecting the shafts to eccentric 44, I prefer to use a second eccentric 70 mounted on the drive shaft 40 and connect it by suitable linkage, such as a rod 71 to a bell crank 72 which is keyed to the shaft 73. The other shaft 73a is not directly linked to the drive shaft but derives motion from the bell crank 72. A crank 86 is keyed to the shaft 73a and a link 85 connects the crank 86 to the free end of the bell crank 72.

The operation of my apparatus will be readily understood. Pulverant material to be fed is introduced into the bin, 20, from the top and flows therefrom continuously by gravity through the open bottom 21 onto the tray 30 and will be supported thereby. During filling of the hopper, before starting operation of the feeder, or after the hopper has become emptied, the gates 24 may be lowered to their lowermost position close to the tray 30 to prevent material from puffing out as it falls down on the tray from a considerable height. When the hopper is filled the gates will be positioned to form on the tray a ribbon of material of desired depth.

As the drive shaft 40 is rotated by the motor 42 and reducer 43, the connecting rod or link 45 will reciprocate the crank 46 back and forth through an angle which is determined by the throw of the eccentric 44. The crank shaft 47 will be turned by crank 46 and will reciprocate the slotted bar 49 through the same angle through which the crank 46 moves. As the bar 49 moves back and forth, the forked link 51 moves the tray, or pan, 30 laterally back and forth. The extent of this movement depends on the positioning of the pin 52 in the slot 50. It will be obvious that when the pin 52 is set at the top end of the slot, which is the center of the reciprocation of the bar 49, there will be no movement of the tray, while there will be maximum movement when it is set at the lowermost end of the slot. Intermediate settings of the pin along the slot will give proportional movements of the tray from zero to maximum.

As the tray 30 thus reciprocates below the bin 20, material supported on the tray 30 backs up against the stationary dividing plate 25 which extends down to adjacent the bottom of the tray 30. This plate divides the ribbon of material on the tray into two parts, and with each stroke of the tray material from one or the other side of the plate is pushed over the corresponding open end 33 of the tray 30. The quantity of material thus pushed from the tray is directly proportional to the amplitude of motion imparted to the tray and the depth of material in the tray. It will be obvious that the rate of feed can, therefore, be readily regulated from zero to maximum feed by proper setting of the pin 52 in the slot 50. When the dial 55 is properly calibrated the pointer 56 will indicate the feed rates at various positions of the pin.

While the output of material from the tray 30 can be exactly regulated by proper setting of the gates 24 and the pin 52 for any given operating conditions, it is also necessary for exact feeding to provide for continuous uniform flow of material to the tray. This is generally achieved by the rocking or tipping motion which is imparted to the tray 30 and which is supplemented by the lateral shifting which is imparted to the material in the bin by the agitating means. The lateral shifting provides a continuous free flow of material to the lower portion of the bin where the material is continuously upheaved by the rocking or tipping movement of the tray to provide for continuous uniform flow from the bin to the tray. The movements of the agitating means as well as of the tipping means are independent of the reciprocating movement although they are effected by the same drive means. The connecting rod 60 links the crank 61 to the main connecting rod 45. While the movement of the rod 45 is utilized to give the tray lateral reciprocation, it is also utilized to reciprocate crank 61. Crank 61, in turn, mover tipper shaft 62 through a fixed angle, and thereby reciprocates the tipper crank 63 keyed to shaft 62. Thus, when the eccentric 44 is rotated by the drive shaft 40, and reciprocates connecting rod 45, the tipper crank 63 reciprocates the tipper link 64 vertically, thereby rocking the tray 30. This rocking of the tray is independent of the lateral reciprocation of the tray, i. e. it continues also when the reciprocating movement is stopped by setting the pin 52 at zero position. Upheaving and free flow of material continue therefore also with very low feed rates. This is an important improvement over feeders wherein feeding and upheaving are caused by one movement only. In such apparatus the upheaving motion ceases when the feed rate becomes very low and the feed is therefore inexact at low rates.

The rocking motion is of fixed minimum amplitude which is a functional value of the radii of cranks 63 and 61 and the vertical amplitude of the movement of the pin connection between the rods 60 and 45. Preferably, the radii of cranks 63 and 61 will be so proportioned as to give only a relatively small tipping movement to the tray 30.

The two motions, horizontal reciprocation and vertical tipping, are imparted to the tray 30 timed at 90° apart. Therefore the tray reaches a substantially level position at each limit of its reciprocation. As the end of the tray at the outer limit of its travel begins to retract inwardly, it is lifted by the tipping mechanism. Oppositely, the other end of the tray, which simultaneously begins to move outwardly, is tipped down. This tipping down enhances refilling of the outwardly moving portion of the tray, while the upward tipping of the retracting end enhances the extrusion of the material on the tipped up side of the tray by a slight compression against the material in the bin and backed against the plate 25.

The hopper agitating mechanism which supplements the upheaving caused by the rocking motion of the tray, or pan, 30 with a positive lateral shifting of material in the bin 20 operates as follows: As the drive shaft 40 is rotated by the motor 42 and reducer 43 the eccentric 70 will reciprocate the rod 71 vertically. The bell crank 72 will thereby me moved through an angle which depends on the throw of the eccentric 70. The shaft 73 reciprocates the rocker arms 75 to oscillate the plates 77 and 78 back and forth in such manner, that as the upper plate 77 is tilted forwardly into the hopper its connected lower plate 78 is tilted backwardly out of the hopper, and vice versa. Simultaneously, the shaft 73a, which is connected to the bell crank 72 by the link 85 and crank 86 reciprocates the rocker arms 75a to oscillate the plates 77a and 78a forwardly into and rearwardly out of the hopper. The connections are such that the plates 77a and 78a will be oscillated simultaneously with, but in reverse sequence relative to, the plates 77 and 78, so that the upper plates move in unison in one direction and simultaneously the lower plates will move in unison in the opposite direction. As the upper and lower plates move in opposite directions they exert pressure on superposed horizontal layers of material and shift the entire layers laterally, but in opposite directions. The simultaneously occurring opposed movements allow for such shifting without waste of power or danger to the hopper. This lateral shifting of the material in opposed layers is a very effective means for breaking up any tendency to compacting and arching and provides agitation over a very large area. The sealing flap or curtain 82 yields readily to the inward or outward push of the plates and provides a very simple and effective seal for the openings 80, 81, 80a and 81a, so that material will not escape therethrough.

With some materials the shifting or agitating mechanism can be dispensed with. My feeder lends itself especially well to such cases where materials of different qualities are fed by the same feeder at different times of the year. Due to the fact that the agitating mechanism is independent of the reciprocating and rocking mechanism it is posible, by providing simple means for disconnecting the eccentric 70 from the drive shaft 40, to operate the feeder without the agitating mechanism, when feeding materials which do not require supplementary agitation. When returning to the feed of more troublesome materials the agitating mechanism will be returned to operative position and will provide the necessary agitation to insure exact feed.

It will be seen that I provide a feeder which will readily feed all types of pulverant materials with extreme accuracy through all feed rates from zero to maximum and which is easily adjustable to any desired rate of feed and to feed of any type of material.

It will be obvious that many changes could be made in the structure of the feeder without departing from the spirit of the invention. Accordingly I do not limit myself to the precise form of the preferred embodiment shown and described herein.

I claim:

1. A feeder for pulverant material comprising a stationary bin having an open bottom, a tray mounted below said open bottom, rocking means connected to said tray and adapted to cause a continual rocking movement of said tray, reciprocating means connected to said tray and adapted to cause a horizontal reciprocation of said tray, a plate mounted in said bin transversely of the direction of reciprocation of said tray across said open bottom and extending downwardly to adjacent said tray, and a prime mover connected to said rocking means and to said reciprocating means.

2. A feeder for pulverant material comprising a stationary bin having an open bottom, a tray pivotally mounted below said open bottom, rocking means connected to said tray and adapted to cause a continual rocking movement of said tray, reciprocating means connected to said tray and adapted to cause a reciprocating movement of said tray, means to vary the length of said reciprocating movement of said tray, a plate mounted in said bin transversely of the direction of reciprocation of said tray across said open bottom and extending downwardly to adjacent said tray, and a prime mover connected to said rocking means and to said reciprocating means.

3. In a feeder for pulverant material including a stationary hopper having an outlet at its lower end, a tray mounted below said hopper for longitudinal reciprocation, and a plate mounted across said outlet transversely of the direction of reciprocation of said tray and extending downwardly to adjacent said tray, openings in opposed walls of said hopper, agitating plates so mounted on each of said walls as to oscillate through said openings, eccentric means connected to said agitating plates and adapted to oscillate said plates simultaneously through said openings, flexible seals for said openings, a second eccentric means, linkage connecting said second eccentric means to the bottom of said tray, a bar curved to form the segment of a circle around the pivotal center of said tray, a rod connected to said pivotal center at one end and movably connected at its other end to said curved bar, means for positioning the end of said rod on said bar, a shaft supporting the upper end of said curved bar, linkage connecting said shaft to said second eccentric means, a connection between said first and second mentioned linkage, a tipper crank connected to said tray and to said second eccentric, and a prime mover connected to both said eccentric means.

4. In a feeder for pulverant material including a stationary rigid hopper, a reciprocable receiving tray, means to reciprocate said tray, a plate mounted across said hopper and adjacent said tray transversely of the direction of reciprocation of said tray, and means for varying the length of stroke of said reciprocating means, rocking means connected to said tray and adapted to impart thereto a continual rocking movement independently of the length of stroke of the reciprocating means and to continually upheave material in the lower portion of said hopper, means adapted to provide free flow of material to said lower portion of said hopper, said means including openings in two opposite walls of said hopper, movable plates mounted for oscillation through said openings, oscillating means connected to said plates, and flexible seals for said openings, and a prime mover connected to said reciprocating means, said rocking means and said oscillating means for moving the same.

5. A feeder for pulverant material comprising a stationary material holding bin having an outlet at its lower end, a material receiving tray pivotally mounted below said outlet, means for upheaving material in said bin including eccentric means connected to said tray and adapted to impart thereto a continual rocking movement, means for continuously removing material from said tray comprising reciprocating means connected to said eccentric means and to said tray and adapted to impart longitudinal reciprocating movement to said tray, and a plate mounted across said outlet transversely of said longitudinal movement and extending downwardly to adjacent said tray, means for regulating the quantity of material removed from said tray comprising means for varying the length of stroke of said reciprocating means, and a prime mover connected to said eccentric means.

6. A feeder for pulverant material comprising a stationary bin having side walls and an outlet through its bottom, a tray, supporting links pivotally holding said tray below said outlet, a drive shaft, an eccentric means on said drive shaft, means for transmitting a variable reciprocating movement to said tray upon rotation of said drive shaft comprising a crank, a link connecting one end of said crank to said eccentric means, a crank shaft rigidly affixed to the other end of said crank, a curved bar affixed to said crank shaft, said bar having a peripheral slot longitudially therethrough being coaxial with the pivotal center of said tray, a link connected with one end to said tray at said pivotal center and movable with the other end along said slot, and means for positioning said link in said slot; means for transmitting a continual rocking movement to said tray upon rotation of said drive shaft including a tipper crank, a linkage connecting said eccentric means with said tipper crank and a second linkage connecting said tipper crank to the bottom of said tray, a plate mounted across said outlet transversely of the reciprocating movement of, and extending downwardly to adjacent, said tray, and a prime mover connected to said drive shaft.

7. In a feeder for pulverant material including a stationary and rigid material holding bin having an outlet at its lower end, a material receiving tray pivotally mounted below said outlet, a prime mover, a drive shaft connected to said prime mover, mean operable to provide a continuous free flow of material to said tray, said means comprising rocking means connected to said drive shaft and to said tray and adapted to impart a continual rocking movement to said tray and to upheave material in said bin upon rotation of said drive shaft, and mean operable to laterally shift superposed layers of material in said bin in opposite directions and comprising openings in the walls of said bin, agitating plates mounted on said bin for oscillation through said openings, and linkage connecting said agitating plates to said drive shaft and adapted to oscillate said plates laterally in unison upon rotation of said drive shaft, means for continuously pushing material alternately from one or the other end of said tray comprising reciprocating means connected to said drive shaft and to said tray in such manner as to impart longitudinal reciprocating movement to said tray upon rotation of said drive shaft, and a dividing plate mounted across said outlet transversely of said reciprocating movement and extending downwardly to adjacent said tray, and means for regulating the quantity of material pushed from said tray comprising a member for varying the effective vertical distance between said outlet and said tray and means for varying the length of stroke of said reciprocating means.

8. In combination with a bin for holding pulverant material, a device for agitating the material comprising an upper and a lower opening in each of two opposed walls of said bin, sealing curtains for said openings, said curtains being fixed with their upper edges to said walls and hanging freely down therefrom to an elevation substantially below said lower openings, a shaft mounted on each of said walls, an upper and a lower plate rigidly mounted on each shaft, said plates corresponding in shape to, and being of such size as to clear, said openings, an eccentric, a prime mover connected to said eccentric, and a linkage connecting said shafts to said eccentric in such manner that upon rotation of said eccentric by said prime mover the upper plates are oscillated in unison laterally in one direction and the lower plates are oscillated simultaneously in unison in the opposite direction.

9. The apparatus of claim 6 comprising also an upper and a lower opening in two opposed side walls of said bin, sealing curtains for said openings, said curtains being fastened with their upper edges to said walls and hanging freely down therefrom to an elevation substantially below said lower openings, an agitator shaft mounted on each of said walls, an upper and a lower plate rigidly mounted on each shaft, said plates corresponding in shape to, and being of such size as to clear, said opening, and linkage connecting said agitator shafts to said drive shaft in such manner that upon rotation of said drive shaft by said prime mover the upper plates are oscillated in unison laterally in one direction and the lower plates are oscillated simultaneously in unison in the opposite direction.

WALTER J. HUGHES.

REFERENCES CITED

The following references are of record in the file of this patent:

UNITED STATES PATENTS

| Number | Name | Date |
|---|---|---|
| 189,917 | Boss | Apr. 24, 1877 |
| 1,179,858 | Menier | Apr. 18, 1916 |
| 1,456,353 | Bare | May 22, 1923 |
| 1,548,385 | Prescott | Aug. 4, 1925 |
| 1,551,810 | Draver | Sept. 1, 1925 |
| 1,783,423 | Harper | Dec. 12, 1930 |
| 1,868,404 | Ziegler | July 19, 1932 |
| 2,116,105 | Eaton | May 3, 1938 |
| 2,153,030 | Venable | Apr. 4, 1939 |
| 2,161,342 | Francis | June 6, 1939 |
| 2,299,394 | Jolly | Oct. 20, 1942 |
| 2,321,965 | Zimmerman | June 15, 1943 |
| 2,338,882 | Todd | Jan. 11, 1944 |
| 2,366,075 | Wegandt | Dec. 26, 1944 |
| 2,364,601 | Colvin | Dec. 12, 1944 |
| 2,381,802 | Booth et al. | Aug. 7, 1945 |

Certificate of Correction

Patent No. 2,520,545 August 29, 1950

WALTER J. HUGHES

It is hereby certified that error appears in the printed specification of the above numbered patent requiring correction as follows:

Column 7, line 1, for the word "mover" read *moves*; line 49, for "me" read *be*; column 10, lines 12 and 18, for "mean" read *means*; line 71, for "opening" read *openings*;

and that the said Letters Patent should be read as corrected above, so that the same may conform to the record of the case in the Patent Office.

Signed and sealed this 12th day of December, A. D. 1950.

[SEAL]

THOMAS F. MURPHY,
*Assistant Commissioner of Patents.*